(12) United States Patent
Iwai

(10) Patent No.: US 10,536,310 B2
(45) Date of Patent: Jan. 14, 2020

(54) SIGNAL GENERATING DEVICE, SIGNAL GENERATING METHOD, ERROR RATE MEASURING APPARATUS, AND ERROR RATE MEASURING METHOD

(71) Applicant: Anritsu Corporation, Kanagawa (JP)

(72) Inventor: Tatsuya Iwai, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 16/372,539

(22) Filed: Apr. 2, 2019

(65) Prior Publication Data

US 2019/0363917 A1 Nov. 28, 2019

(30) Foreign Application Priority Data

May 25, 2018 (JP) ................................. 2018-100379

(51) Int. Cl.
| | |
|---|---|
| *H04L 27/12* | (2006.01) |
| *H04L 27/02* | (2006.01) |
| *H04B 10/54* | (2013.01) |
| *H04B 10/524* | (2013.01) |
| *H04L 27/34* | (2006.01) |

(52) U.S. Cl.
CPC ......... *H04L 27/122* (2013.01); *H04B 10/524* (2013.01); *H04B 10/541* (2013.01); *H04L 27/02* (2013.01); *H04L 27/3405* (2013.01)

(58) Field of Classification Search
CPC ....... H04L 27/122; H04L 27/02; H04L 5/023; H04L 27/3405; H04B 10/524; H04B 10/541; H04B 14/02; H03M 5/12
See application file for complete search history.

(56) References Cited

U.S. PATENT DOCUMENTS

| | | | | |
|---|---|---|---|---|
| 2004/0193995 | A1* | 9/2004 | Park | H03M 13/136 714/752 |
| 2006/0277434 | A1* | 12/2006 | Tsern | G06F 11/1008 714/17 |
| 2019/0229844 | A1* | 7/2019 | Coulombe | H03M 13/3761 |

FOREIGN PATENT DOCUMENTS

JP 2018-033098 A 3/2018

\* cited by examiner

*Primary Examiner* — Ted M Wang
(74) *Attorney, Agent, or Firm* — Pearne & Gordon LLP

(57) ABSTRACT

In a signal generating device 2, first signal generation means 12 for generating a most significant bit signal stream MSB, second signal generation means 13 for generating a least significant bit signal stream LSB, a mask generation means 14 for defining a bit that allows error insertion and a bit that prohibits error insertion with different pieces of bit information, and generating a mask pattern of each of the most significant bit signal stream MSB and the least significant bit signal stream LSB, based on symbol transition information indicating a transition destination of four PAM4 symbols of a PAM4 signal; and error insertion means 15 for inserting an error, based on bit information of the mask pattern corresponding to each bit of the most significant bit signal stream and the least significant bit signal stream designated according to a symbol error rate.

8 Claims, 3 Drawing Sheets

SIGNAL GENERATING DEVICE, SIGNAL GENERATING METHOD, ERROR RATE MEASURING APPARATUS, AND ERROR RATE MEASURING METHOD

TECHNICAL FIELD

The present invention relates to a signal generating device and a signal generating method for generating a desired 4-level Pulse Amplitude Modulation (PAM4) signal, and an error rate measuring apparatus and an error rate measuring method for inputting a PAM4 signal as a test signal to a device under test (DUT) to measure bit error rate (BER).

BACKGROUND ART

In standards such as 100G and 400G defined by the Institute of Electrical and Electronics Engineers (IEEE), transmission by PAM4 signals is regulated rather than transmission by conventional PAM2 (Non Return to Zero: NRZ) signals in order to cope with ultrahigh speed of bit rates.

As shown in Patent Document 1, for example, the PAM4 signal can be generated as a four-valued signal of 0(00), 1(01), 2(10), and 3(11) by generating the most significant bit signal stream MSB and the least significant bit signal stream LSB by using two signal sources and adding these signals.

However, when considering simulation of a bit error due to influence of signal deterioration or the like in the physical layer, only value transition of 0→1 or 1→0 in the conventional NRZ signal is performed, so it is possible to simulate bit errors only by inverting the bits at the last stage of the signal generating device.

RELATED ART DOCUMENT

Patent Document

[Patent Document 1] JP-A-2018-033098

DISCLOSURE OF THE INVENTION

Problem that the Invention is to Solve

However, in the case of the PAM4 signal, there are two bits of the most significant bit signal stream MSB and the least significant bit signal stream LSB. Therefore, by simply performing bit inversion on the last stage of the four PAM4 symbols 0(00), 1(01), 2(10), and 3(11), it is obtained that 0(00)→3(11), 1(01)→2(10), 2(10)→1(01), 3(11)→0(00).

In the above precondition that the influence of signal deterioration or the like is simulated, it is considered that the PAM4 symbol is shifted by one symbol. However, if bit inversion is simply performed on the four PAM4 symbols at the last stage, there is a case where the symbol is not shifted by one symbol, such as 0(00)→3(11) or 3(11)→0(00), and there is a problem with inserting an error that would not normally occur. Therefore, it has been desired to provide a signal generating device capable of controlling error insertion such that it becomes a designated PAM4 symbol.

Therefore, the present invention has been made in view of the above problems, and an object of the present invention is to provide a signal generating device and a signal generating method capable of controlling error insertion so as to be a designated PAM4 symbol, and an error rate measuring apparatus and an error rate measuring method capable of measuring an error rate by a PAM4 signal whose error insertion is controlled.

Means for Solving the Problem

In order to achieve the above purpose, according to an aspect of the present invention, there is provided a signal generating device which generates a 4-level pulse amplitude modulation (PAM4) signal, including first signal generation means for generating a most significant bit (MSB) signal stream, second signal generation means for generating a least significant bit (LSB) signal stream, and signal synthesizing means for adding up the most significant bit signal stream and the least significant bit signal stream to generate the PAM4 signal, the device including: mask generation means for generating a mask pattern for distinguishing between a bit that allows error insertion and a bit that prohibits error insertion, for a bit stream of each of the most significant bit signal stream and the least significant bit signal stream, based on symbol transition information indicating a transition destination of four PAM4 symbols of the PAM4 signal; and error insertion means, installed at a stage preceding the signal synthesizing means, for inserting an error based on the mask pattern.

In the signal generating device according to the aspect, the error insertion means inserts an error based on the mask pattern corresponding to each bit of the most significant bit signal stream and the least significant bit signal stream designated according to a symbol error rate.

In the signal generating device according to the aspect, the symbol transition information is set such that the PAM4 symbol is shifted by one symbol.

According to another aspect of the present invention, there is provided an error rate measuring apparatus including: the signal generating device according to the aspect; and an error measuring device that measures an error rate by receiving a signal from a device under test upon input of the PAM4 signal generated by the signal generating device to the device under test.

According to still another aspect of the present invention, there is provided a signal generating method for generating a 4-level pulse amplitude modulation (PAM4) signal, including a step of generating a most significant bit (MSB) signal stream, a step of generating a least significant bit (LSB) signal stream, and a signal synthesizing step of generating the PAM4 signal, by adding the most significant bit signal stream and the least significant bit signal stream, the method including: a step of generating a mask pattern for distinguishing between a bit that allows error insertion and a bit that prohibits error insertion, for a bit stream of each of the most significant bit signal stream and the least significant bit signal stream, based on symbol transition information indicating a transition destination of four PAM4 symbols of the PAM4 signal; and a step of inserting an error based on the mask pattern, the inserting being performed before the signal synthesizing step.

In the signal generating method according to the aspect, in the step of inserting an error, an error is inserted based on the mask pattern corresponding to each bit of the most significant bit signal stream and the least significant bit signal stream designated according to a symbol error rate.

In the signal generating method according to the aspect, the symbol transition information is set such that the PAM4 symbol is shifted by one symbol.

According to still another aspect of the present invention, there is provided an error rate measuring method, the method including: a step of inputting a PAM4 signal generated by the signal generating method according to the aspect to a device under test; and a step of measuring an error rate by receiving a signal from the device under test upon input of the PAM4 signal to the device under test.

Advantage of the Invention

According to the present invention, it is possible to control error insertion such that it becomes a designated PAM4 symbol, and it is also possible to deal with simulation of a bit error due to an effect of signal deterioration or the like in the physical layer.

BEST MODE FOR CARRYING OUT THE INVENTION

Hereinafter, best modes for carrying out the present invention will be described in detail with reference to the accompanying drawings.

Figure 1:
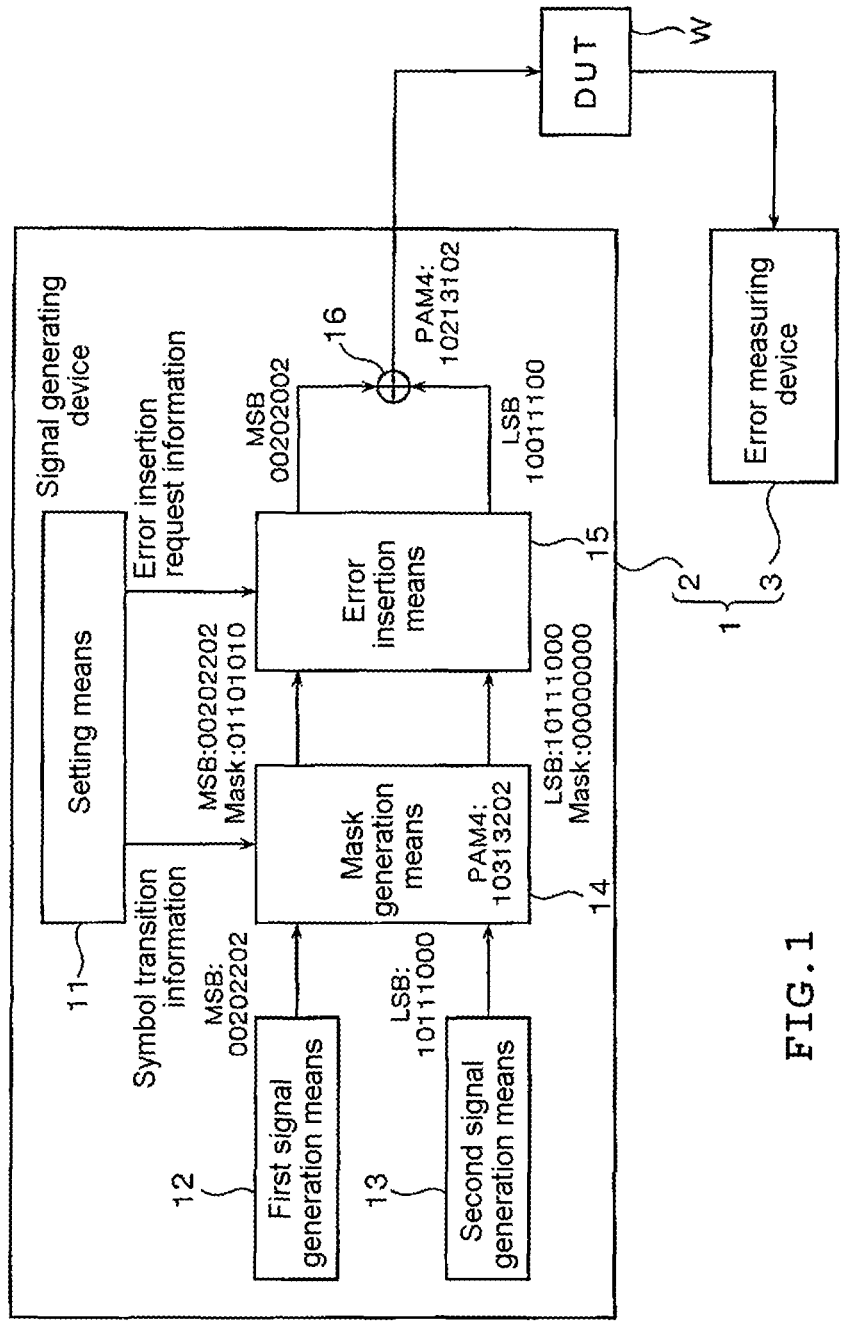
FIG. 1 is a block diagram showing a schematic configuration of an error rate measuring apparatus including a signal generating device according to the present invention.
Figure 2:
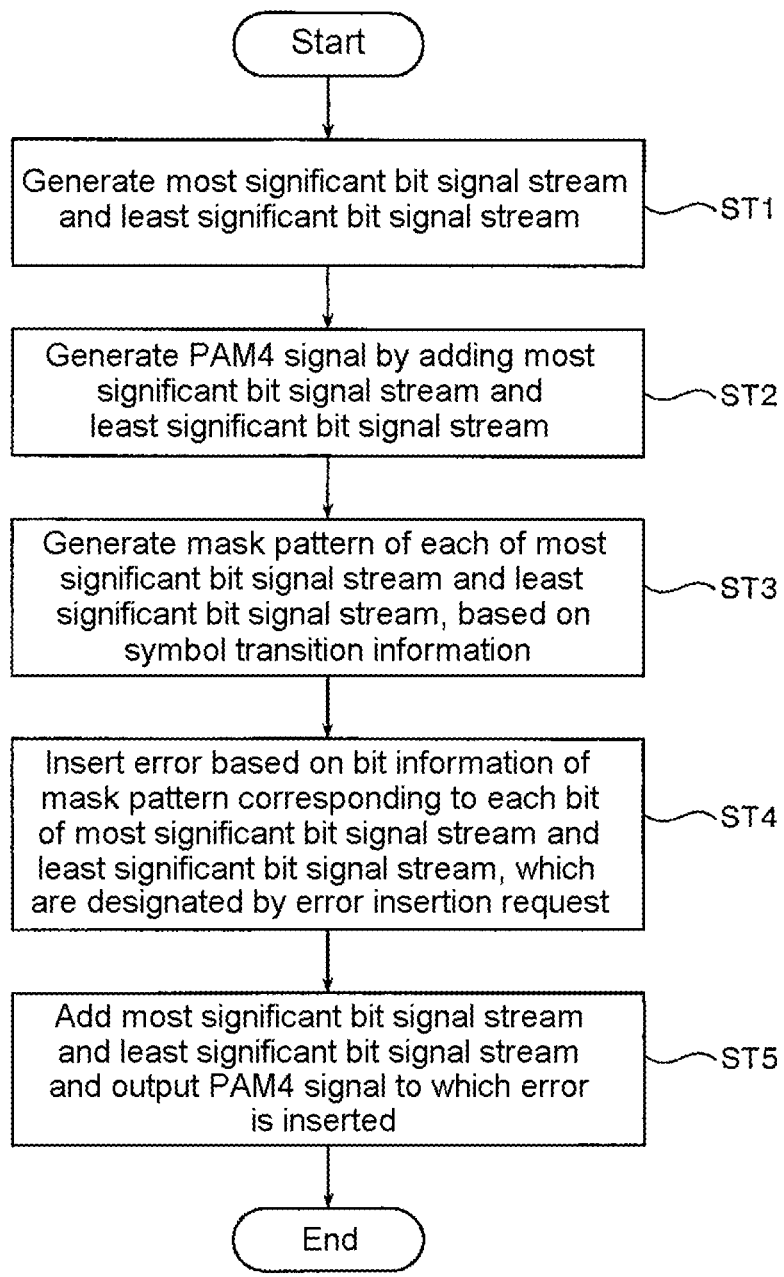
FIG. 2 is a flowchart of a case where a PAM4 signal in which an error is inserted is generated by the signal generating device of the error rate measuring apparatus according to the present invention.

As shown in FIG. 1, an error rate measuring apparatus 1 of the present embodiment roughly includes a signal generating device 2 and an error measuring device 3, and is configured to input a PAM4 signal of a known pattern as a test signal to a device under test (DUT) and measure a bit error rate (BER).

As shown in FIG. 1, the signal generating device 2 includes setting means 11, first signal generation means 12, second signal generation means 13, mask generation means 14, error insertion means 15, and signal synthesizing means 16, and is configured to generate the PAM4 signal by controlling error insertion such that it becomes a designated PAM4 symbol.

The setting means 11 sets a symbol error rate and symbol transition information. This setting can be performed, for example, through a user interface on a setting screen of display means (not shown).

The symbol transition information is information indicating the transition destination for each symbol of the four PAM symbols of the PAM4 signal at the time of error insertion. For example, in a case of simulating a bit error due to signal deterioration or the like in the physical layer, symbol transition information is set such that the PAM4 symbol is shifted by one symbol, such as symbol 0(00)→ symbol 1(01), symbol 1(01)→symbol 2(10), symbol 2(10)→symbol 1(01), and symbol 3(11)→symbol 2(10).

In addition, the symbol error rate and the symbol transition information are stored in advance in storage means (not shown), and can be appropriately selected and set through the user interface by the setting means 11. Further, the symbol transition information is not limited to the transition of only one symbol, and can be arbitrarily set.

The first signal generation means 12 generates a most significant bit signal stream MSB for generating the PAM4 signal by adding it to the least significant bit signal stream LSB generated by the second signal generation means 13.

The second signal generation means 13 generates a least significant bit signal stream LSB for generating the PAM4 signal by adding it to the most significant bit signal stream MSB generated by the first signal generation means 12.

The mask generation means 14 generates a PAM4 signal by adding together the corresponding bits of the most significant bit signal stream MSB generated by the first signal generation means 12 and the least significant bit signal stream LSB generated by the second signal generation means 13.

In addition, the mask generation means 14 defines a bit that allows error insertion and a bit that prohibits error insertion with different pieces of bit information (0, 1), and generates a mask pattern of the most significant bit signal stream MSB and a mask pattern of the least significant bit signal stream LSB with bit information (0, 1), based on symbol transition information. For example, as bit information, the bit that allows error insertion is defined as 0 and a bit that prohibits error insertion is defined as 1, and the mask pattern of the most significant bit signal stream MSB and the mask pattern of the least significant bit signal stream LSB are generated based on the symbol transition information. Then, the mask generation means 14 outputs the most significant bit signal stream MSB, the least significant bit signal stream LSB, the mask pattern of each of the most significant bit signal stream MSB and the least significant bit signal stream LSB to the error insertion means 15.

The error insertion means 15 confirms the bit information of the mask pattern corresponding to each bit of each of the most significant bit signal stream MSB and the least significant bit signal stream LSB, designated by the error insertion request information, and inserts an error in that bit when bit information of the mask pattern allows error insertion.

In addition, since the error insertion request information is determined in accordance with the symbol error rate set by the setting means 11, the error insertion request information is information for designating a bit to request error insertion, to what number of bits from the input the error is to be inserted.

The signal synthesizing means 16 adds the most significant bit signal stream MSB and the least significant bit signal stream LSB after error insertion by the error insertion means 15 and outputs a PAM4 signal. The PAM4 signal is input to the device W under test as a test signal of a known pattern, when the error rate of the device W under test is measured.

When a PAM4 signal is input to the device W under test as a test signal of a known pattern from the signal generating device 2, the error measuring device 3 receives a signal from the device W under test upon inputting the PAM4 signal and measures an error rate.

Next, in the signal generating device 2 of the error rate measuring apparatus 1 configured as described above, as a method of generating a PAM4 signal by controlling error insertion such that it becomes a designated PAM4 symbol, a case where an error is inserted to the third and sixth bits from the input to generate a PAM4 signal will be described as an example.

In addition, as bit information for generating a mask pattern, the bit that allows error insertion is defined as "0" and a bit that prohibits error insertion is defined as "1".

First, the setting means 11 sets symbol transition information. For example, symbol transition information is set such that the PAM4 symbol is shifted by one symbol, such as symbol 0(00)→symbol 1(01), symbol 1(01)→symbol 2(10), symbol 2(10)→symbol 1(01), and symbol 3(11)→symbol 2(10).

Further, the setting means 11 sets a symbol error rate (for example, 1×10-5). For example, the symbol error rate is set such that the third and sixth bits from the input (the third and sixth bits from the right) are designated as bits requesting error insertion.

When the above setting is completed and a PAM4 signal is generated, the first signal generation means 12 generates the most significant bit signal stream MSB, and the second signal generation means 13 generates the least significant bit signal stream LSB (ST1).

In the example of FIG. 1, the first signal generation means 12 generates "00202202" as the most significant bit signal stream MSB. Further, the second signal generation means 13 generates "10111000" as the least significant bit signal stream LSB.

Next, the mask generation means 14 generates a PAM4 signal by adding the corresponding bits of the most significant bit signal stream MSB generated by the first signal generation means 12 and the least significant bit signal stream LSB generated by the second signal generation means 13 (ST2).

Figure 3A:
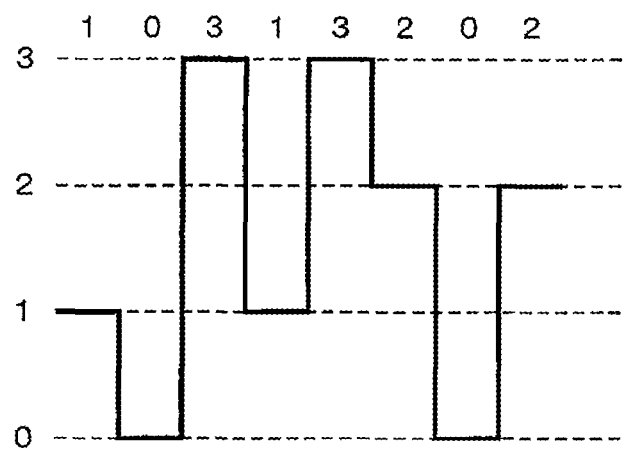
FIGS. 3A and 3B are diagrams showing an example of a PAM4 signal before and after an error insertion in the signal generating device according to the present invention.

In the example of FIG. 1, since the most significant bit signal stream MSB is "00202202" and the least significant bit signal stream LSB is "10111000", as shown in FIG. 3A, "10313202" is generated as a PAM4 signal.

Further, the mask generation means 14 generates mask patterns of the most significant bit signal stream MSB and the least significant bit signal stream LSB, based on the symbol transition information, respectively (ST3).

For example, in FIG. 1, paying attention to the third bit (the third bit from the right) from the input of the PAM4 signal "10313202", the PAM4 symbol is the symbol 2(10). Since the symbol transition information is the symbol 2(10)→symbol 1(01), in order to shift the symbol 2(10) to the symbol 1(01), it is necessary to insert an error in the third bit of each of the most significant bit signal stream MSB and the least significant bit signal stream LSB. Therefore, the third bits of both the mask pattern of the most significant bit signal stream MSB and the mask pattern of the least significant bit signal stream LSB are information "0" which allows error insertion.

Further, in FIG. 1, paying attention to the sixth bit (the sixth bit from the right) from the input of the PAM4 signal "10313202", the PAM4 symbol is the symbol 3(11). Since the symbol transition information is the symbol 3(11)→symbol 2(10), in order to shift the symbol 3(11) to the symbol 2(01), it is necessary to insert an error in the sixth bit of the least significant bit signal stream LSB, without inserting an error in the sixth bit of the most significant bit signal stream MSB. Therefore, the sixth bit of the mask pattern of the most significant bit signal stream MSB is information "1" that prohibits error insertion, and the sixth bit of the mask pattern of the least significant bit signal stream LSB is information that allows error insertion is information "0".

In the example of FIG. 1, the mask pattern of the most significant bit signal stream MSB is generated as "01101010" and the mask pattern of the least significant bit signal stream LSB is generated as "00000000", based on the symbol transition information set such that the PAM4 symbol transitions by one symbol.

Next, the error insertion means 15 confirms the bit information of the mask pattern corresponding to each bit of each of the most significant bit signal stream MSB and the least significant bit signal stream LSB, designated by the error insertion request information. If the bit information of the mask pattern is information that allows error insertion, an error is inserted into the bit (ST4).

In the example of FIG. 1, since the bits designated by the error insertion request information are the third and sixth bits, the third and sixth bit information pieces of the mask patterns of the most significant bit signal stream MSB and the least significant bit signal stream are confirmed. For the most significant bit signal stream MSB, the third bit information of the mask pattern is information "0" that allows error insertion, so an error is inserted in the third bit. For the least significant bit signal stream LSB, the third and sixth bit information pieces of the mask pattern are information "0" that allows error insertion, so an error is inserted in the third and sixth bits.

Next, when an error is inserted by the error insertion means 15, the signal synthesizing means 16 adds the corresponding bits of the most significant bit signal stream MSB and the least significant bit signal stream LSB to each other and outputs a PAM4 signal (ST5).

Figure 3B:
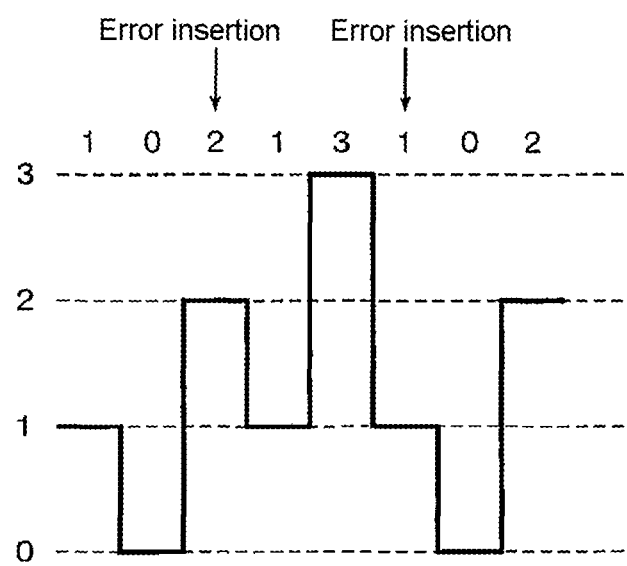

In the example of FIG. 1, after error insertion, the most significant bit signal stream MSB is "00202002" and the least significant bit signal stream LSB is "10011100", so as shown in FIG. 3B, "10213102" is output as a PAM4 signal after error insertion.

The PAM4 signal generated from the signal generating device 2 as described above is input to the device W under test as a test signal for measuring the error rate. When a PAM4 signal is input to the device W under test, the error measuring device 3 receives a signal from the device W under test upon inputting the PAM4 signal to the device W under test, and measures an error rate.

However, in the above-described embodiment, a mask pattern is generated by defining bits that allow error insertion as 0 and bits that prohibit error insertion as 1 as bit information indicating permission and prohibition of error insertion, the definition may be reversed. That is, it is also possible to generate a mask pattern by defining the bit that allows error insertion as "1" and the bit that prohibits error insertion as "0".

As described above, according to the present embodiment, it is possible to control error insertion such that it becomes the designated PAM4 symbol when an error is inserted into an arbitrary PAM4 symbol. Thus, it is possible to cope with the simulation of a bit error and the test of error resistance due to the influence of signal deterioration or the like in the physical layer.

Although the best mode of the signal generating device, the signal generating method, the error rate measuring apparatus, and the error rate measuring method according to the present invention has been described above, the present invention is not limited by the description and drawings according to this mode. In other words, it is a matter of course that other modes, examples, operation techniques and the like made by those skilled in the art based on this mode are all included in the scope of the present invention.

DESCRIPTION OF REFERENCE NUMERALS AND SIGNS 1 error rate measuring apparatus
2 signal generating device
3 error measuring device
11 setting means
12 first signal generation means
13 second signal generation means 14 mask generation means
15 error insertion means
16 signal synthesizing means
W device under test (DUT)

What is claimed is:

1. A signal generating device which generates a 4-level pulse amplitude modulation (PAM4) signal, including first signal generation means for generating a most significant bit (MSB) signal stream, second signal generation means for generating a least significant bit (LSB) signal stream, and signal synthesizing means for adding up the most significant bit signal stream and the least significant bit signal stream to generate the PAM4 signal, the device comprising:
   mask generation means for generating a mask pattern for distinguishing between a bit that allows error insertion and a bit that prohibits error insertion, for a bit stream of each of the most significant bit signal stream and the least significant bit signal stream, based on symbol transition information indicating a transition destination of four PAM4 symbols of the PAM4 signal; and
   error insertion means, installed at a stage preceding the signal synthesizing means, for inserting an error based on the mask pattern.

2. The signal generating device according to claim 1, wherein the error insertion means inserts an error based on the mask pattern corresponding to each bit of the most significant bit signal stream and the least significant bit signal stream designated according to a symbol error rate.

3. The signal generating device according to claim 1, wherein the symbol transition information is set such that the PAM4 symbol is shifted by one symbol.

4. An error rate measuring apparatus comprising:
   the signal generating device according to claim 1; and
   an error measuring device that measures an error rate by receiving a signal from a device under test upon input of the PAM4 signal generated by the signal generating device to the device under test.

5. A signal generating method for generating a 4-level pulse amplitude modulation (PAM4) signal, including a step of generating a most significant bit (MSB) signal stream, a step of generating a least significant bit (LSB) signal stream, and a signal synthesizing step of generating the PAM4 signal, by adding the most significant bit signal stream and the least significant bit signal stream, the method comprising:
   a step of generating a mask pattern for distinguishing between a bit that allows error insertion and a bit that prohibits error insertion, for a bit stream of each of the most significant bit signal stream and the least significant bit signal stream, based on symbol transition information indicating a transition destination of four PAM4 symbols of the PAM4 signal; and
   a step of inserting an error based on the mask pattern, the inserting being performed before the signal synthesizing step.

6. The signal generating method according to claim 5, wherein in the step of inserting an error, an error is inserted based on the mask pattern corresponding to each bit of the most significant bit signal stream and the least significant bit signal stream designated according to a symbol error rate.

7. The signal generating method according to claim 5, wherein the symbol transition information is set such that the PAM4 symbol is shifted by one symbol.

8. An error rate measuring method comprising:
   a step of inputting a PAM4 signal generated by the signal generating method according to claim 5 to a device under test; and
   a step of measuring an error rate by receiving a signal from the device under test upon input of the PAM4 signal to the device under test.

* * * * *